United States Patent [19]

Divens et al.

[11] Patent Number: 4,656,358
[45] Date of Patent: Apr. 7, 1987

[54] LASER-BASED WAFER MEASURING SYSTEM

[75] Inventors: William G. Divens; William B. Cole, both of Mountain View; Michael W. Leitner, Sunnyvale; David A. Blau, Los Altos, all of Calif.

[73] Assignee: Optoscan Corporation, Mountain View, Calif.

[21] Appl. No.: 711,122

[22] Filed: Mar. 12, 1985

[51] Int. Cl.[4] .................... G01N 21/55; G01B 11/04
[52] U.S. Cl. .................. 250/372; 250/359.1; 250/461.1; 250/491.1; 250/492.2; 356/386
[58] Field of Search ............... 250/372, 491.1, 492.2, 250/461.1, 560, 563, 358.1, 359.1, 458.1; 356/72, 73, 386, 387, 445; 382/8, 22

[56] References Cited

U.S. PATENT DOCUMENTS

| | | | |
|---|---|---|---|
| 3,814,945 | 6/1974 | Allnutt et al. | 356/445 |
| 4,027,973 | 6/1977 | Kaye | 356/73 |
| 4,030,827 | 3/1985 | Delhaye et al. | 356/301 |
| 4,112,309 | 9/1978 | Nakazawa et al. | 356/445 |
| 4,195,930 | 4/1980 | Delhaye et al. | 355/301 |
| 4,259,574 | 3/1981 | Carr et al. | 250/302 |
| 4,269,515 | 5/1981 | Altman | 356/387 |
| 4,352,016 | 9/1982 | Duffy et al. | 250/358.1 |
| 4,402,613 | 9/1983 | Daly et al. | 356/445 |

FOREIGN PATENT DOCUMENTS 2113832  8/1983  United Kingdom ............. 356/387

OTHER PUBLICATIONS

"Laser Micrometrology for Integrated Circuits,", D. Nyyssonen, Proc. Inspection, Measurement and Control Sym., Boston, Sep. 20–23, 1982, pp. 24–30.
"A Fluorescent Linewidth Measurement System for VLSI Fabrication," Stephen J. Erasmus, et al, Proc. SPIE Int. Soc. Opt. Eng., vol. 480, pp. 57–64, 1984.
"Laser Interferometric X-Y Measuring Machine Model 21," Nikon, Tokyo, Japan, Jul. 1983.
"VLS-I—Video Linewidth System," Optical Specialties, Inc., Fremont, Calif., undated.

Primary Examiner—Carolyn E. Fields
Attorney, Agent, or Firm—Townsend and Townsend

[57] ABSTRACT

An optical system and associated electronic processing for measuring 0.5-micron and larger dimensions on sample wafers by transversely moving the sample under a stationary microspot provided by a tightly-focused ultraviolet ("UV") laser beam and detecting the interaction of the laser microspot with the sample. The optical system includes a high numerical aperture objective close to the sample surface, a first UV optical train, a second UV optical train, and a UV detector. The first train transports the laser beam to the objective for focusing at the sample surface. The second train communicates UV light emanating from the surface and passing through the objective to the UV detector. The second optical train preferably includes a pinhole which provides added spatial resolution, both laterally and vertically. Light emanating from scattering centers laterally away from the spot or from deeper layers within the wafer focus at different points and are blocked by the edges of the pinhole.

20 Claims, 9 Drawing Figures

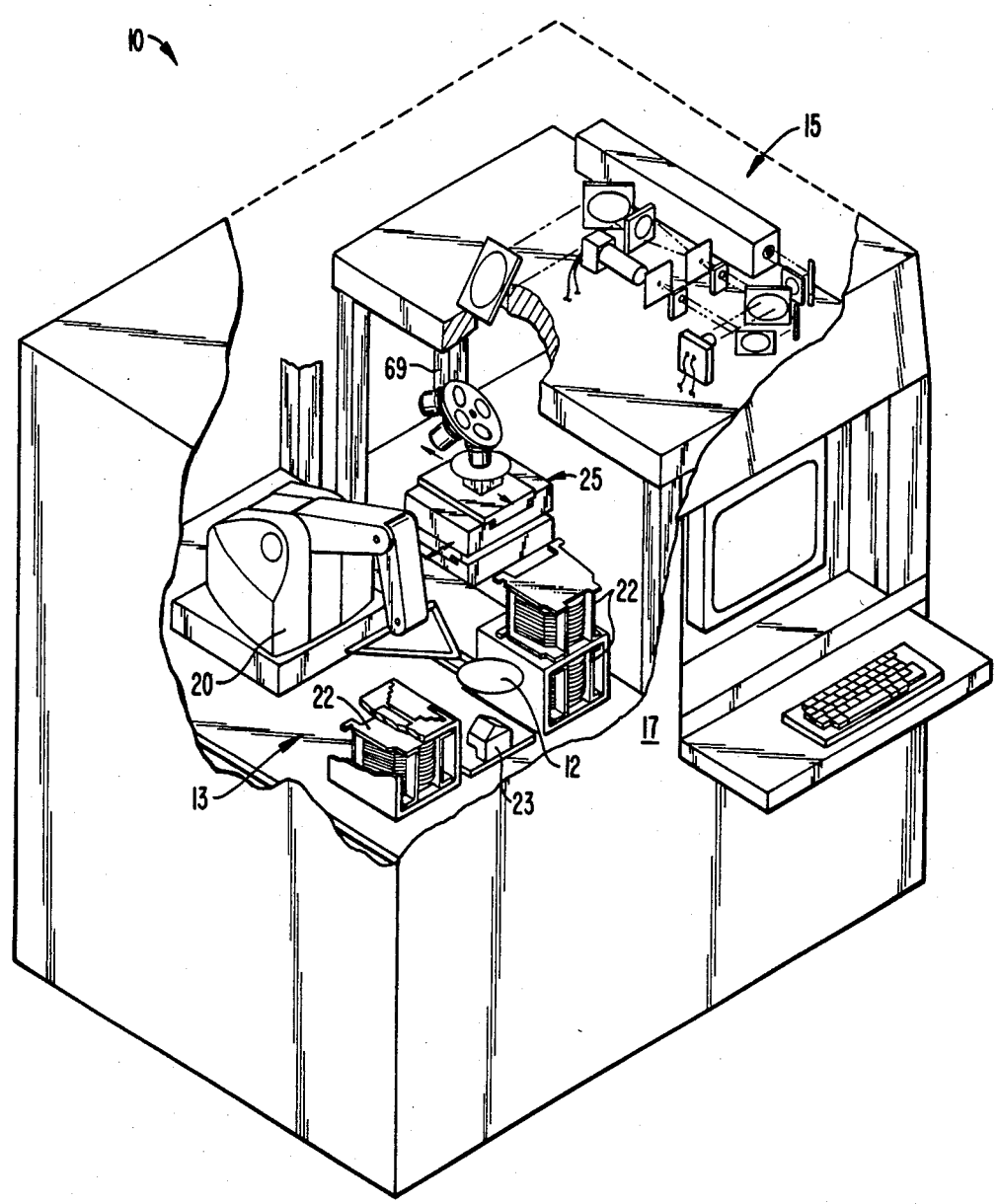
FIG._1.

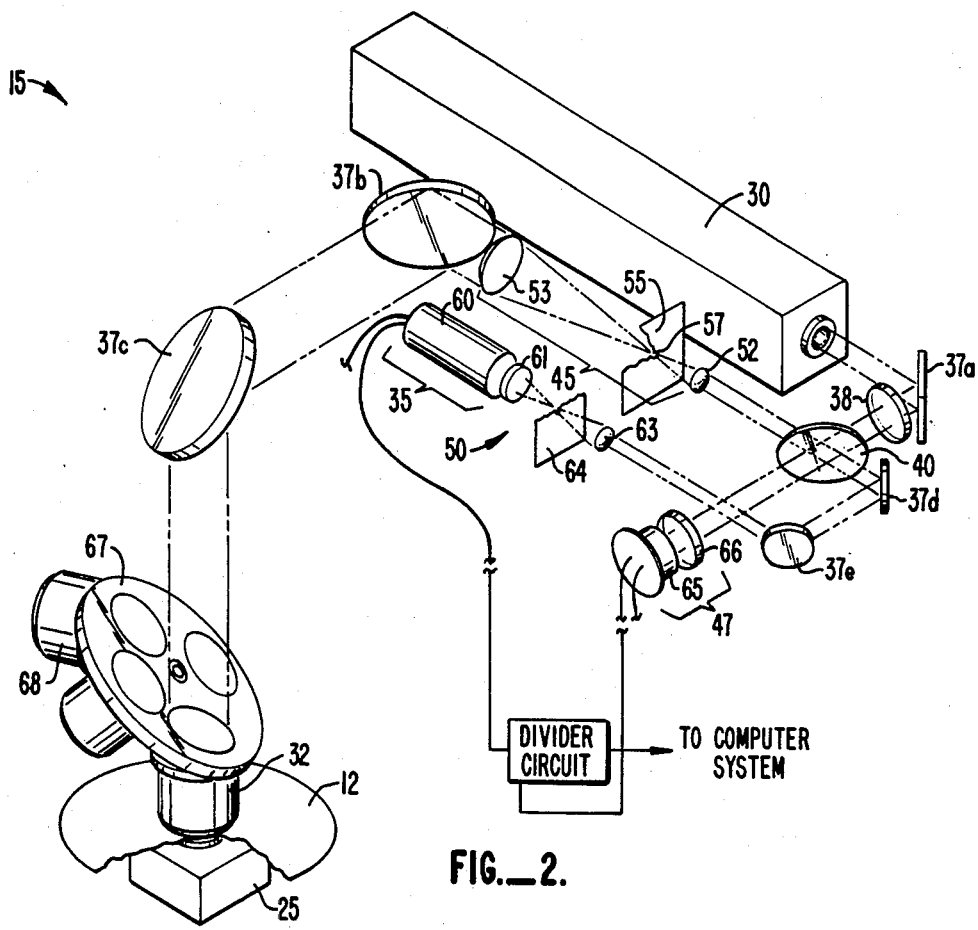
FIG._2.
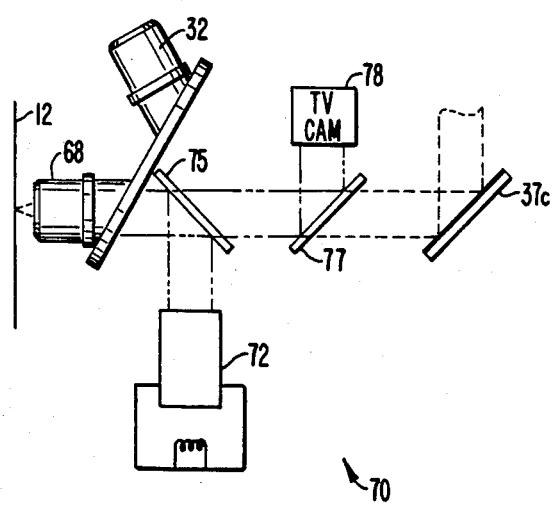
FIG._3.

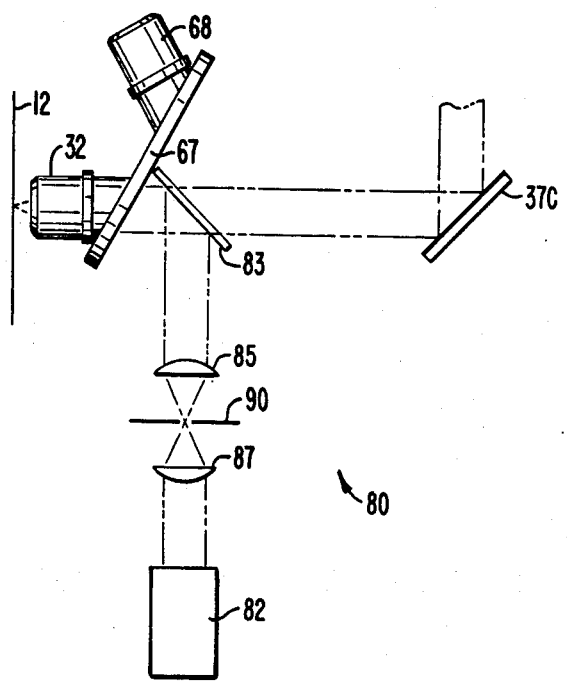
FIG._4.
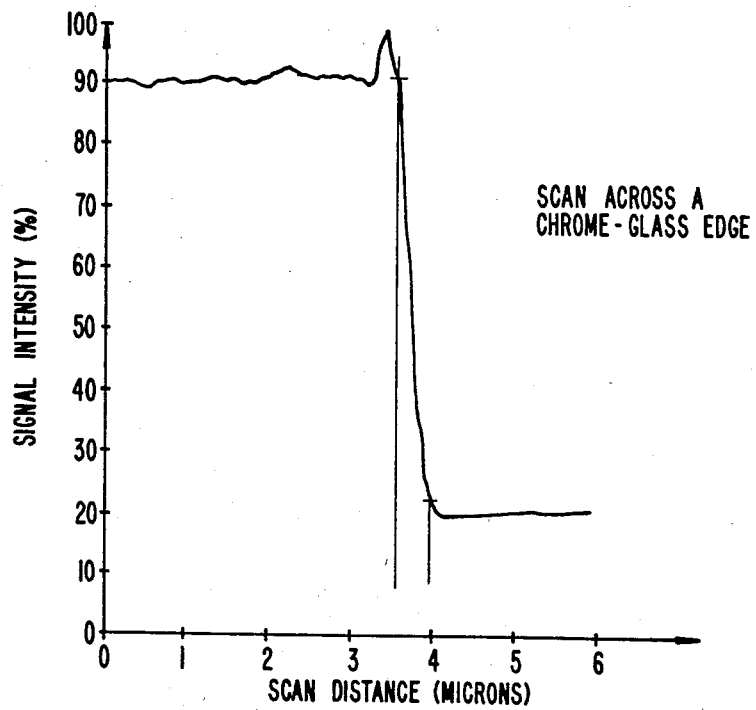
FIG._5.

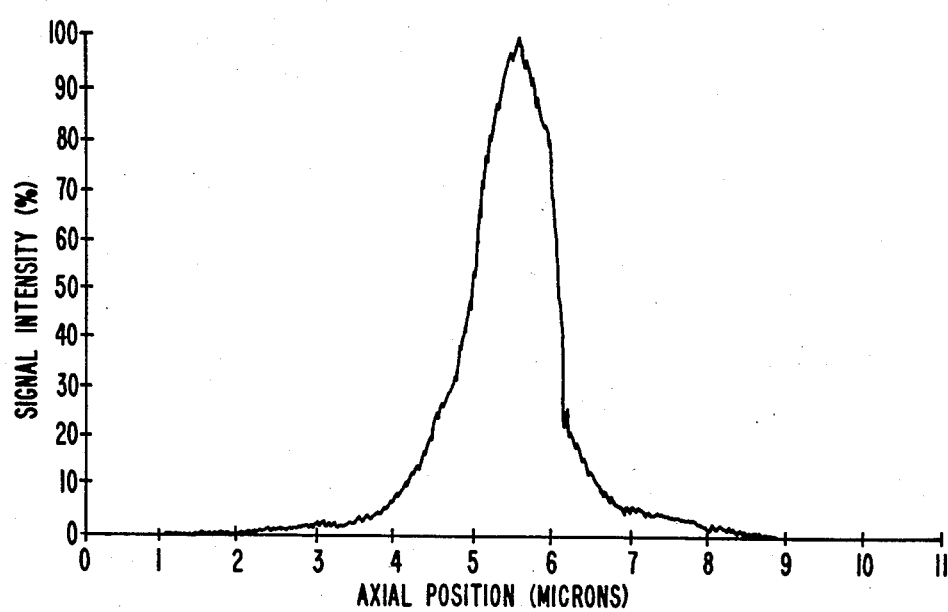
FIG._6A.
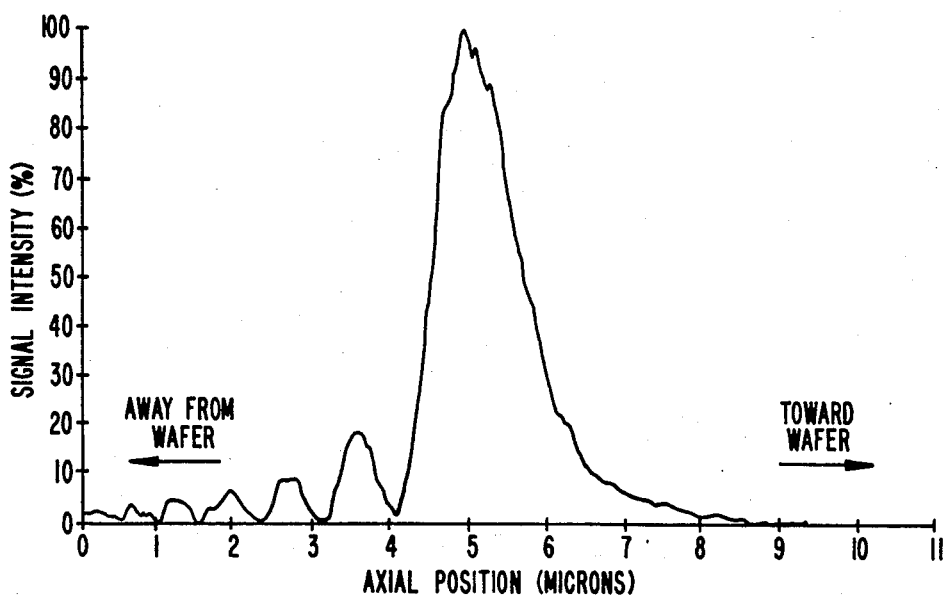
FIG._6B.

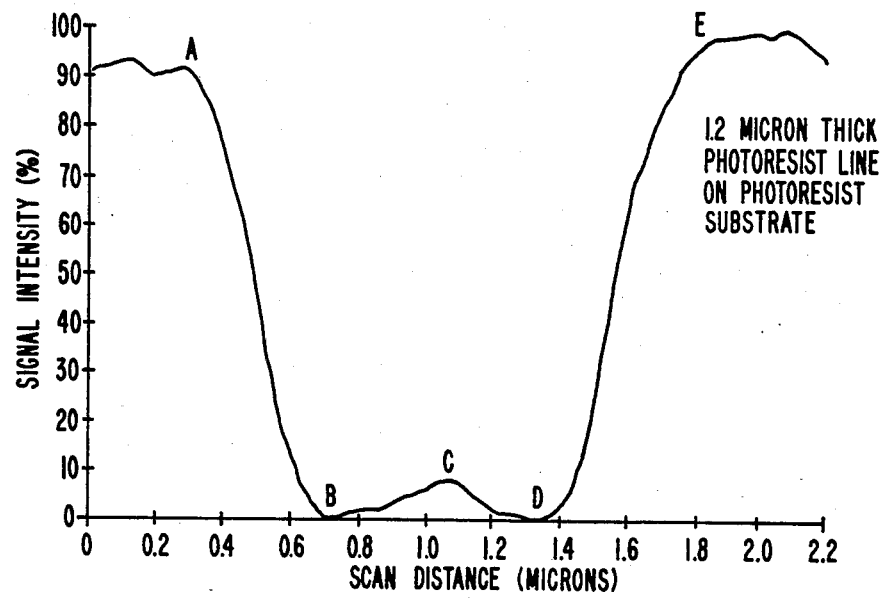
FIG._7.
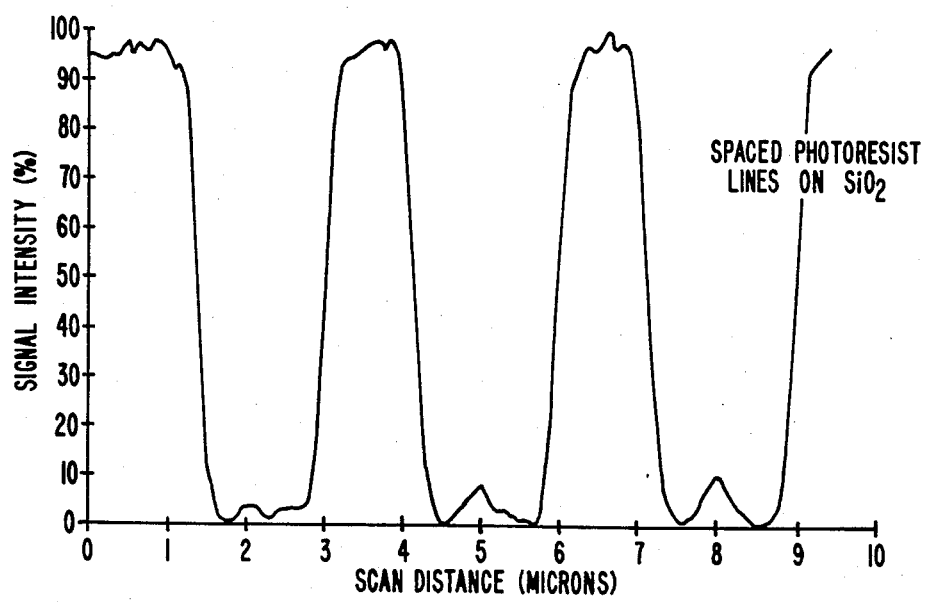
FIG._8.

LASER-BASED WAFER MEASURING SYSTEM

FIELD OF THE INVENTION

The present invention relates generally to semiconductor process measurement systems, and more specifically to a system for measuring critical dimensions and mask registration and alignment.

BACKGROUND OF THE INVENTION

The process of semiconductor manufacture entails a precise sequence of alternating microlithographic steps and wafer treatment steps such as etching or ion implantation. Any given microlithographic step forms a pattern of photoresist on the wafer to define the portions of the wafer that are subjected to the subsequent treatment step. The microlithographic steps, of which there are on the order of eight to twelve, are the most critical in the wafer fabrication process since they pattern the device levels prior to subsequent irresversible processing steps. Not only must each photoresist pattern be correct in itself, but each must be precisely registered to the patterns that have been formed in previous steps.

Current fabrication practice is to measure critical dimensions and overlay registration after microlithography steps, since these measurements contain a great deal of information regarding the general status of the process. Critical dimensions outside specified limits indicate problems with projection system focus and exposure or improper development of the photoresist, while mask registration measurements outside specified limits indicate that the most recently projected mask level is not properly aligned with other pattern levels on the wafer.

On the basis of these measurements, the process engineer can diagnose and correct process problems before more wafers are incorrectly patterned. If the wafers are valuable or have been processed to a high level, the most recent photoresist layer can be stripped from the wafer and the microlithography process repeated for that particular mask level.

The increased complexity of VLSI wafer processing equipment demands even more measurement and inspection than previously. The projection systems in use now approach the physical limit of light diffraction for lines below 1.5 microns in width. At the same time, the market needs are such that etching machines are expected and required to produce square 1-micron profiles with 1:1 aspect ratios. Needless to say, small deviations in the operating parameters of these machines can be disastrous.

Current methods of measuring critical dimensions utilize optical microscope image analysis, helium-neon red laser edge scatter, or a scanning electron microscope. The first two may also be used for mask registration measurement. However, as will be discussed below, each method presents certain problems that render the method less than ideal.

The first method, microscope image analysis, utilizes a television camera or a scanning slit attached to the camera port of a white light illuminated microscope. The image or scan signal is transmitted to a digitizer and thence to a dedicated computer. The operator chooses, by means of a cursor or cross hairs, the critical dimension to be measured, and the computer calculates the line width from the dark-to-bright transitions on the digitized image. The system is normally calibrated to a standard photo mask.

While optical microscope image analysis has been used widely, and is popular because of its relatively low cost and ease of operation, as the scale of semiconductor devices has shrunk, the method has been unable to provide the necessary performance. Thus, lack of resolution, diffraction from line edges, interference from underlying structures and layers, and an inability to determine shapes of line edges render this method unsuitable for measuring sizes or shapes of lines smaller than approximately 2.0 microns.

The second method employs a scanning red laser, the beam of which is focused by an objective lens to a microspot of about 1 micron in diameter. The microspot is focused on the surface of a wafer which is moved under the microspot, and suitably placed detectors detect scattered light. Where there are no structures on the surface, a very low level of scattered light is detected; at an edge, light is scattered by the spot-edge interaction.

Line widths are defined by the distance between the detected edges, and while this measurement method appears to work well on photo masks, it works poorly on wafers. This is because the red laser light used for edge detection is transmitted by most wafer processing layers such as photoresist, polysilicon, and silicon dioxide. The light transmitted through transparent layers causes interference effects which degrade measurement.

The third method of measuring critical dimensions (but not mask registration) utilizes a scanning electron microscope (SEM). SEM's are capable of magnifying an image on a wafer more than 50,000 times and therefore are useful for detailed wafer inspection.

However, a number of problems render the SEM unsuitable for use as an in-process tool. One class of problems arises from the fact that SEM's capable of measuring wafer structures nondestructively must operate at a very high vacuum ($10^{-7}$ torr). Inherent problems with cycling high-vacuum systems limit the throughput to approximately ten wafers per hour at five measurements per wafer. High precision stages must also be developed which can cycle continuously in high vacuum with no lubrication. A second class of problems results from the basic physics of SEM operation. Since the magnification is read from currents flowing through scan coils, since the electron trajectory is affected by the inevitable column contamination, and since the nature of the secondary electron signal is to provide very low contrast, SEM's are characterized by poor reproducibility. A third class of problems relates to longevity. Presently available electron sources such as lanthanum hexaboride last no more than about 500 hours.

Moreover, since SEM's can only view surface structure, they cannot be used for registration measurement, and therefore cannot be the basis for a combined critical dimension and registration instrument.

Thus, it can be seen that the prior art systems cannot make measurements at the small scale now required, cannot provide the high throughput, reproducibility, and reliability necessary for in-process measurements, or cannot provide the full range of measurements needed. What is needed is an instrument capable of accurately measuring features in the 0.5–1.5 micron range (as well as larger features) at a high throughput (say 60 wafers per hour) while providing the capability of determining registration and alignment from one layer to the next.

SUMMARY OF THE INVENTION

The present invention provides an optical system and associated electronic processing for measuring 0.5-micron and larger dimensions on sample wafers with high precision and high throughput. The invention can make measurements of critical dimensions and mask registration.

Broadly, this is accomplished by transversely moving the sample under a stationary microspot provided by a tightly-focused ultraviolet ("UV") laser beam and detecting the interaction of the laser microspot with the sample. To this end, the optical system includes a high numerical aperture objective close to the sample surface, a first UV optical train, a second UV optical train, and a UV detector. The first train transports the laser beam to the objective for focusing at the sample surface. The second train communicates UV light emanating from the sample surface and passing through the objective to the UV detector. The optical system may also include a third visible train and a visible light detector. In such a case, the third train communicates visible light emanating from the sample surface and passing through the objective to the visible detector. The three optical trains are partially overlapping with suitable beam splitters serving to differentiate the beam paths.

The first optical train preferably includes a pinhole at an intermediate point of focus to spatially filter the beam and reduce the effective spot size to less than about 0.3 microns. Interaction of the focused UV beam with non-fluorescent materials causes scattering and reflection of UV light which passes back into the objective, through the second optical train, and to the UV detector which provides a signal representative of the intensity of such scattered or reflected light. When the focused ultraviolet beam impinges on photoresist material, it causes fluorescence in the visible range. A portion of the visible light passes back into the objective, through the third optical train, and to the visible detector which provides a signal representative of the intensity of the fluorescent radiation.

The plots of intensity as a function of transverse position of the sample provide accurate and reproducible profiles of the features being measured. These profiles may be generated from the reflected UV signal, or where the system includes the visible train, from the fluorescent visible signal. Since the spatial intensity distribution of the probing microspot is precisely known, the beam shape can be deconvolved from the detected signal. Given the generally accepted rule that the center of a Gaussian shape can be easily determined to within one percent of its width, the optically-induced resolution limit is less than 0.003 micron.

Where the feature being measured is characterized by boundaries across which the reflectivity changes, the reflected UV signal provides very clean profiles. This would be the case where the feature is a photoresist line on a highly polished silicon substrate; photoresist has a reflectivity of about 4% as compared with 10-20% or more for the silicon. Where the photoresist absorbs UV light strongly, the absorptive nature of the material substantially eliminates diffraction effects at the line edges and from underlying layers. Any light diffracting around the edge of the absorptive material is absorbed by the material before it has a chance to reflect from the underlying layer and constructively or destructively interfere with itself.

The second optical train preferably includes a second pinhole (which may be the same physical element as the pinhole in the first train) and possibly a third pinhole. The pinholes provide added spatial resolution, both laterally and vertically. Light emanating from scattering centers laterally away from the spot or from deeper layers within the wafer focus at different points and are blocked by the edges of the pinholes. The sensitivity to vertical positioning also provides for a rapid and effective auto-focus mechanism.

Where the edge of a feature is to be detected on the basis of the UV signal, the beam is first focused on the highly reflective region. When the sample is moved so that the beam starts impinging on the less reflective region, to the extent that the two regions are not coplanar, the intensity falloff due to operation of the pinhole reinforces that due to reduced reflectivity.

A further understanding of the nature and advantages of the present invention may be realized by reference to the remaining portions of the specification and the attached drawings.

BRIEF DESCRIPTION OF THE DRAWINGS

FIG. 1 is an isometric view of a wafer measuring instrument according to the present invention;

FIG. 2 is an optical schematic of the optical measurement system;

FIG. 3 is an optical schematic of a visible light illumination and imaging system;

FIG. 4 is an optical schematic of a visible light monitoring system;

FIG. 5 is an intensity profile obtained by scanning across a chrome/glass boundary;

FIGS. 6A-B are plots showing the depth-dependence of intensity of the reflected signal;

FIG. 7 is an intensity profile obtained by scanning across a photoresist line on a photoresist substrate; and FIG. 8 is an intensity profile obtained by scanning across a series of photoresist lines on a silicon dioxide substrate.

DESCRIPTION OF THE PREFERRED EMBODIMENT

Overview

FIG. 1 is an isometric view of a wafer measurement instrument 10 used for measuring critical dimensions and mask registration and alignment on semiconductor wafers 12. The basic components of instrument 10 include a wafer handling system 13, an optical system 15, and a dedicated computer 17. The invention relates primarily to optical system 15; therefore, wafer handling system 13 and computer 17 will only be described briefly.

Wafer handling system 13 includes a robot arm 20, one or more wafer cassettes 22, a flat finder 23, and a movable stage 25. Robot arm 20 may be a standard commercial device such as a Microbot Alpha II from Microbot, Inc., Mountain View, Calif. A linear actuator is preferably mounted to the end of the robot arm to facilitate certain rectilinear motions. Flat finder 23 may be a standard commercial device such as a Model 2800 LC from Cybeg Systems, Menlo Park, Calif. Stage 25 includes a mechanical stage for imparting coarse x-y motion and a piezoelectric transducer mounted thereon for imparting fine x-y motion. The mechanical stage has a linear encoder which provides position information to a precision of about 0.5 micron. The piezoelectric transducer position is sensed by capacitive detectors. The latter are calibrated by an interferometer and provide position information precise to about 0.005 micron.

Computer 17 controls and monitors the operation of the wafer handling and optical systems. In operation, robot arm 20, under the control of computer 17, transfers a wafer from cassette 22 to flat finder 23, which rotates the wafer so as to align the wafer's flat along a known direction. The robot arm then transfers the wafer to stage 25. Stage 25, as controlled by signals from computer 17, imparts controlled movement to the wafer placed thereon. Optical system 15 illuminates the wafer on stage 25 in a manner that provides one or more intensity signals. Computer 17 correlates these signals with the stage movement to determine a line width or other critical dimension on wafer 12. When the measurements are completed for the particular wafer under test, robot arm, again under the control of computer 17, transfers the wafer from stage 25 to the same or a different one of cassettes 22.

Optical System Structure

FIG. 2 is an isometric schematic showing the optical layout of optical system 15. In the broadest sense, optical system operates to focus an ultraviolet (UV) microspot on the sample surface and sense the interaction of the UV light with the surface. The optical system includes a UV laser 30, a high numerical aperture objective 32, a UV detector 35, and a variety of optical elements defining a number of optical trains. The first optical train transports at least a portion of the UV laser beam to objective 32 in order that the beam be brought to a tight focus at the surface of the particular wafer 12 that is on stage 25. The second optical train transports UV light emanating from the wafer surface and passing through objective 32 to UV detector 35.

The optical trains will be described by following the light from laser 30 to objective 32 and back to UV detector 35. The optical trains include a number of beam steering mirrors 37a–e interposed at various places for the purpose of folding the beam paths to make them more compact. These mirrors, preferably plane front surface aluminum mirrors, will not be described further.

The beam emanating from laser 30 encounters mirror 37a, a neutral density filter 38, and a beam splitter 40. The reflected portion is directed to encounter a beam expander 45, which also acts as a first spatial filter, and mirrors 37b and 37c prior to reaching objective 32. The transmitted portion of the light at beam splitter 40 is directed to a reference detector 47.

The UV light emanating from the surface of wafer 12 and passing back through objective 32 encounters mirrors 37c and 37b, beam expander 45, and beam splitter 40. The transmitted portion of this light encounters mirrors 37d and 37e and a second spatial filter 50 prior to reaching UV detector 35.

UV laser 30 may be a standard commercial device such as a Model No. 356-2S helium-cadmium laser from Omnichrome, Chino, Calif. Such a laser provides substantially monochromatic coherent radiation at a wavelength of 0.325 micron. The laser operates at about 3 milliwatts.

Neutral density filter 38 effects an intensity reduction of 2.5 orders of magnitude (a factor of about 320). Beam splitter 40 is a quartz flat oriented at 45° to the beam; the flat reflects about 4% of the incident beam energy. Thus, the beam travelling toward objective 32 is attenuated by a total factor of about 8000 so that the beam power incident on the wafer is a fraction of a microwatt.

Objective 32 is a high numerical aperture UV-transmitting objective, in particular a 0.9-n.a. quartz objective. The objective is characterized by a cone half-angle of about 60° and a working distance of about 250 microns when the objective is focused on the sample surface. The objective is corrected for spherical aberration, astigmatism, and coma at 0.325 microns. A lens having these specifications may be obtained from Tropel Corporation, Rochester, N.Y.

Beam expander 45 comprises a pair of positive quartz lenses 52 and 53 and an intermediate pinhole 55. The relative positions are such that lens 52 intercepts the slightly diverging laser beam and focuses it at a point 57 at which pinhole 55 is situated. Pinhole 55 is located at the focal plane of lens 53 so that the light diverging from point 57 is collimated by lens 53. The focal lengths and positions are such that the beam diameter is expanded to about 7 mm so as to fill objective 32. Respective focal lengths of 15 mm and 140 mm are typical. The pinhole diameter is preferably in the range of 10–20 microns (15 microns in the specific embodiment).

UV detector 35 comprises a photomultiplier 60 and a UV-selective filter 61 that allows only UV light to reach photomultiplier 60. Second spatial filter 50, which may be placed in the path of the light reaching detector 35, comprises a lens 63 and a pinhole 64. The relative positions are such that lens 63 intercepts the slightly converging light emanating from lens 52 (and reflected by mirrors 37d and 37e) and focuses it at the point at which pinhole 64 is located. A focal length of 15 mm for lens 63 and a pinhole diameter of 10–15 microns (10 microns in the specific embodiment) are alpropriate. Spatial filter 50 provides additional resolution (small effective spot size).

Reference detector 47 preferably comprises a photodiode 65 and a UV-selective filter 66. The signal from reference detector 47 is representative of the laser intensity, and is used to normalize the signal from UV detector 35.

Objective 32 is mounted on a motor-driven turret nose 67, which also carries a plurality of visible objectives 68. In the preferred embodiment, there are three parcentered visible objectives, having respective magnifications of 5×, 20×, and 100×. These are used for the imaging subsystem (described below), their use being necessitated in part by the fact that UV objective 32 does not produce exceptionally good images in the visible range. Turret nose 67 is mounted to a stage 69 (see FIG. 1) for providing axial motion of the objective toward and away from the sample surface.

FIG. 3 is an optical schematic illustrating a visible light illumination and imaging subsystem 70 suitable for interposition in the collimated leg adjacent objectives 32 and 68. Subsystem 70 operates in conjunction with visible objectives 68, and is used for locating global registration marks, which are relatively large indicia, typically crosses or chevrons, placed on the wafer at an early stage. These are used by the mask aligners in the step and repeat cameras to orient the stage of the wafer movement system with the coordinate system of the wafer itself. These marks are normally covered with photoresist which, while strongly absorbing in the UV region, transmits well at higher wavelengths.

Illumination and imaging subsystem 70 includes an illuminator 72, a quartz flat 75, a UV/visible beam splitter 77, and a TV camera 78. Illuminator 72 may be a standard white-light microscope illuminator. Quartz flat 75 is disposed in the beam path so as to direct a portion of the visible light from illuminator 72 to objective 68 in order to illuminate the surface of wafer 12. The visibly illuminated wafer is imaged by objective 68; most of the visible light passes through flat 75 and is reflected by beam splitter 77 to TV camera 78.

FIG. 4 is an optical schematic of a visible light monitoring subsystem 80 suitable for interposition in the collimated leg for monitoring visible light emanating from the surface of wafer 12, such as that produced when the laser beam strikes fluorescent photoresist. Subsystem 80 includes a visible light detector 82 and a third optical train for transporting the visible light from objective 32 to detector 82. The third optical train includes a UV/visible beam splitter 83, a pair of lenses 85 and 87, and a pinhole 90. Beam splitter 82 is disposed in the beam so as to divert visible light emanating from the sample surface and passing through objective 32, and directs this light toward lens 85. Since objective 32 has different focal lengths for visible and UV light, the visible light emanating from the UV focal point is not collimated by the objective. Pinhole 90 is located so that visible light emanating from the UV focal point of objective 32 is focused by lens 85 at pinhole 90, and the light emerging from pinhole 90 is collimated by lens 87. As in the case of pinhole 55, pinhole 90 operates to block light emanating from points removed from the point at which the laser beam is focused. Thus, the pinhole reduces the intensity of light reaching detector 92 if the visible light is not emanating from the focal plane of objective 32. Visible light monitoring subsystem 80 may be used to measure boundaries between fluorescent and non-fluorescent materials.

Operation

A typical measurement procedure entails a global registration step using visible light illumination and imaging subsystem 70, followed by the UV measurement of the selected features.

The location of the global registration marks proceeds by interposing visible objectives of successively increasing power in the path. At each step, standard pattern recognition techniques are used to locate the mark, and the mechanical stage is driven to center the mark in the field. As the magnification increases, the location becomes more precise so that the position is ultimately determined to a resolution of about 0.5 micron. Since the techniques for determining the registration marks are not part of the invention, they will not be described further.

The UV measurement process requires a very small spot on the wafer surface. From a geometrical optics point of view, the envelope of the beam emerging from the objective would be a double right circular cone with its vertex in the focal plane. However, due to the finite size of the beam, the beam envelope is a hyperboloid of one sheet. The equation which describes the spot radius r(z) as a function of the disstance z from the focal plane is:

$$r(z) = r_0 \sqrt{1 + \left(\frac{\lambda z}{\pi r_0^2}\right)^2}$$

where $\lambda$ is the laser wavelength and $r_0$ is the minimum spot radius. In the absence of aberrations (diffraction limited case) $r_0$ for a focused Gaussian beam is given by:

$$r_0 = \left(\frac{2\lambda}{\pi}\right)(f.no.)$$

where (f.no.) is the useable f-number of the objective, which is given by the effective focal length divided by the input beam diameter of the Gaussian profile beam. In the context of a Gaussian beam, the radius typically refers to the distance from the axis to the points where the beam intensity has fallen off by a factor of $e^2$. If the beam intensity as a function of radial distance from the axis is given by $I_0 \exp[r^2/(2\sigma^2)]$, the radius is $2\sigma$ and the diameter is $4\sigma$.

Beam expander 45 operates to increase the diameter of the beam reaching objective 32 so that the full diameter of the objective is utilized. This provides a minimum spot size. Beam expander 45 also operates to collimate the light that travels to objective 32. While this is not necessary for the operation of the invention, it makes positioning of the elements relatively less critical and facilitates the interposition of other elements and optical subsystems in the region between the beam expander and the objective.

Pinhole 55 spatially filters the laser beam traveling to the objective by removing high spatial frequency components and noise resulting from diffraction and scatter. The result is a beam whose energy profile as a function of transverse dimension is very nearly Gaussian.

In an ideal case, second spatial filter 50 might be unnecessary. The need seems to arise due to the finite tolerances and aberrations that are present in the actual system. It has been found that if pinhole 55 is made small enough to provide the desired degree of spatial filtering for the beam traveling toward detector 35, it acts as an aperture for the beam traveling toward objective 32 and produces undesirable diffraction effects.

FIG. 5 is an intensity profile obtained by scanning across a chrome/glass boundary. A glass sample with a 0.1-micron chrome layer was mounted on stage 25 and the beam focused on the chrome surface. The stage was then moved so that the boundary of the chrome layer passed under the beam spot. The profile exhibits a rapid falloff at the boundary. The width of the falloff region corresponds to the spot diameter, about 0.4 microns for the particular case shown.

FIGS. 6A and 6B are plots of the intensity of the signal from detector 35 as a function of axial displacement of the wafer surface from the focal plane of the objective 32. The two plots correspond to two nominally identical objectives.

Both plots exhibit a relatively smooth and well-behaved peak characterized by a full width at half maximum of approximately 1.3 microns. The plot of FIG. 6B exhibits some intensity variations for distances greater than the focal distance. It is believed that these arise from diffraction effects, possibly due to decentration of one or more elements of the objective.

Since the spot size is very small compared with the beam diameter and focal distance, for focusing considerations the beam envelope can be considered conic. Regardless of the sample location, the reflected beam will be characterized by the same cone angle. However, where the sample is farther from the objective, the reflected cone will be larger than the incident cone at the objective; where the sample is closer, the reflected cone will be smaller than the incident cone at the objective. In either case, the objective will not collimate the reflected light.

The operation of pinhole 55 on the reflected light renders the system highly sensitive to the distance between objective 32 and the sample surface. As discussed above, if the sample surface is in the focal plane of objective 32, the light emanating from the surface acts as a point source in the plane of the sample surface. This light is collimated by passage through objective 32, is brought to a focus precisely at the location of pinhole 55, and passes through with little attenuation. However, to the extent that the reflection does not occur at the focal plane of objective 32, the reflected light is not collimated by the objective, and is focused at other than the location of pinhole 55, whereupon only a fraction passes through to reach UV detector 35.

The sharply peaked dependence of intensity on axial position permits a relatively efficient auto-focus function to be carried out. The intensity exhibits a well-defined maximum as the objective is moved axially relative to the sample surface. It is noted that if the objective has a large depth of focus, the intensity signal is not as sharply peaked, but in such a case the need for precise focusing is commensurately lower. Accordingly, pinhole 55 operates to provide a focusing sensitivity that is just as sensitive as required.

The auto-focus is carried out for the global registration and measurement steps using UV objective 32 and the focused UV beam. For the global registration step, the system is first focused so that the UV reflected intensity is maximized. To the extent that visible objectives 68 are not parfocal relative to UV objective 32, the visible objectives are displaced by appropriate offsets as determined during instrument calibration.

Consider next the measurement itself, in particular a measurement to detect the edge of a photoresist line on a silicon substrate. The measurement proceeds as follows. First, the beam is focused on the silicon surface, with the intensity of the beam being maximized as a function of axial positioning as discussed above. The silicon's reflectivity is about 10–20% or more. As the wafer is moved so that the beam spot begins impinging on the photoresist, the intensity falls off due to the cooperation of three factors.

First, the photoresist absorbs UV light so that the only reflected light comes from the photoresist-air interface (about 4% reflectivity). Thus, since the reflectivity is several times lower, a commensurate decrease in intensity may be expected.

Second, the operation of pinhole 55 comes into play. More particularly, since the system was focused for the silicon surface, the light reflected from the top surface of the photoresist is not collimated by the objective. Accordingly, the light is focused at a point other than the location of pinhole 55 and is therefore attenuated by the pinhole. Thus, the operation of the pinhole significantly increases the contrast at the photoresist boundary, and renders the basic measurement more sensitive and precise.

Third, the photoresist boundary is not perfectly sharp, but typically has a trapezoidal profile. As the beam spot begins impinging on the sloping shoulder, the reflected cone is no longer directed along the axis, and a significant fraction of the light falls outside the gathering range of objective 32.

The invention does not require that the reflectivity change across the boundary being measured, so long as the height or inclination changes. FIG. 7 is an intensity profile for a sample having a 1.2-micron thick photoresist line deposited on a photoresist substrate. Such a photoresist line is typically characterized by a trapezoidal cross-section, that is, by sloping shoulders on either side of a plateau. The UV laser beam was focused on the substrate on one side of the line, and the sample was moved transversely so that the spot impinged first on one shoulder, then on the plateau, then on the other shoulder, and finally on the substrate on the other side of the line. As can be seen from the plot, the intensity falls from a maximum level at a point A to zero at a point B, rises slightly at a point C, falls to zero at a point D, and rises to the maximum value at a point E. Point A corresponds to the point where the beam spot begins impinging on the bottom of the photoresist shoulder. Of the light falling on the shoulder, the detected intensity is reduced, due in part to each of the second and third factors discussed above. Point B corresponds to the point where the beam spot is near the top of the shoulder, but not yet striking the plateau. At this point the intensity has fallen to zero, due to the beam's being out of focus and reflected off axis. Point C corresponds to a point where the beam spot is impinging on the plateau. The beam, while out of focus, is reflected symmetrically about the axis, and some of the UV reflected light is detected. Points D and E are similar to points B and A, respectively.

FIG. 8 is an intensity profile obtained by scanning across a number of nominally evenly spaced photoresist lines on a silicon-dioxide substrate. Generally, the silicon-dioxide substrate has a reflectivity similar to the reflectivity of the photoresist-air interface (on the order of 4%). This plot, although drawn on a smaller scale, shows the same features as the plot of FIG. 7.

As can be seen from FIGS. 5, 7, and 8, the actual shape of the intensity profile is a result of the finite beam size, the step size (line thickness or height), and the shape of the line edges. For example, the profile of a Gaussian beam scanned across the edge of an infinitely thin layer is essentially the integral of a Gaussian function. The point at which the intensity is halfway between the maximum and minimum values corresponds to the edge location, with half the beam on one side of the edge and half on the other.

While the actual profiles depart from this ideal behavior, the halfway point on the intensity profiles still represents a viable working definition of the edge location. Thus, a line width is given by the distance between those points on the profiles that are halfway between the maximum and minimum. Although the line width thus obtained may differ from the "true" line width, the measurement provides a precise characterization of the line repetition interval, the uniformity of line width and spacing, and the reproducibility of the features from wafer to wafer. To the extent that the absolute line width measurement is critical, appropriate offsets can be determined and incorporated into the measurement.

In many instances, there is a certain amount of noise on the signal, thereby rendering it somewhat difficult to specify the halfway points. However, the following procedure provides a well-defined threshold level corresponding to the halfway level. First, the average intensity is computed. Second, the number of data points above and below the average are determined to establish a duty cycle and corresponding scaling factor.

Third, a weighted average utilizing the scaling factor is computed, thereby providing a level that serves as the halfway level.

Although the effect of noise could be reduced by subjecting the data to a filtering procedure, such a procedure would also tend to degrade the edges (make them less steep). Similarly, while the edges could be sharpened by using a technique such as a deconvolution filter, use of such a technique would also tend to enhance the noise.

Visible light monitoring subsystem 80 may be used to augment or substitute for the UV profile measurement. Consider, for example, a measurement to detect the edge of a photoresist line on a silicon substrate. Depending on the particular application, the measurement proceeds according to one or the other of two procedures as follows.

In the first procedure, the UV laser beam is focused on the substrate surface, with the intensity of the UV signal being maximized as a function of axial positioning as discussed above. As the wafer is moved transversely so that the UV beam spot begins impinging on the edge of the photoresist, the impingement of the UV beam on the photoresist causes fluorescence, and the large numerical aperture lens captures a significant portion of the fluorescent radiation emanating from the surface. Initially, this fluorescent radiation appears as a point source near the substrate surface, is approximately collimated by objective 32 and is deflected out of the UV beam path by beam splitter 82. As more of the beam spot strikes the photoresist, the intensity of fluorescent radiation increases. Some offset to this increase occurs since the photoresist thickness, typically on the order of 1.2 microns, causes the focus to shift so that pinhole 90 blocks some of the fluorescent radiation.

In the second procedure, the UV laser beam is focused on the photoresist surface. As the wafer is moved transversely so that the beam spot begins impinging on the edge of the photoresist, the intensity falls off due to the following factors. If the photoresist line has perfectly steep edges, portions of the beam spot miss the photoresist and hit the substrate, whereupon the fluorescence is decreased. However, even if the photoresist line has trapezoidal edges, the beam spot is no longer focused on the edges, which are at a different elevation, and the pinhole 90 operates to reduce the intensity. Thus the intensity profile allows the precise determination of the location, and to some extent the shape of the line edge.

Conclusion

In conclusion, it can be seen that the present invention provides a wafer measuring system characterized by the high throughput, reducibility, reliability, and accuracy required by modern-day semiconductor fabrication processing. The intensity profiles obtained from the optical system allow the relevant information to be extracted in a straightforward manner.

While the above is a complete description of the preferred embodiments of the invention, various modifications, alternate constructions, and equivalents may be employed wiithout departing from the spirit of the invention. For example, the second optical train (which transports UV light from the objective to the UV detector) could be split off from the first optical train (which transports the laser beam to the objective) so that the returning light does not traverse beam expander 45 (with pinhole 55). Therefore, the above description and illustration should not be taken as limiting the scope of the invention which is defined by the appended claims.

What is claimed is:

1. Apparatus for making a measurement of a feature on a sample surface, comprising:
   a high numerical aperture objective transmissive to ultraviolet light;
   a laser operable to produce an ultraviolet laser beam;
   an ultraviolet detector operable to produce a signal representative of the intensity of the ultraviolet light impinging thereon;
   first beam transport means for directing at least a portion of said ultraviolet laser beam to said objective, said first beam transport means and said objective operating together to provide a focused beam spot; and
   second beam transport means for directing ultraviolet light that emanates from the location of said focused beam spot and subsequently passes through said objective to said ultraviolet detector, said second beam transport means including means for substantially preventing ultraviolet light that emanates from points displaced from the location of said focused beam spot from reaching said ultraviolet detector;
   wherein, when said ultraviolet laser is operated and the sample is registered with said focused beam spot on the sample surface and the axis of said objective perpendicular to the sample surface, said ultraviolet detector provides a signal representative of the ultraviolet light reflected from the sample surface.

2. The apparatus of claim 1 wherein said objective is also transmissive to visible light, and further comprising:
   a visible detector operable to produce a signal representative of the intensity of visible light impinging thereon; and
   third beam transport means for directing visible light that emanates from the location of said focused beam spot and subsequently passes through said objective to said visible light detector.

3. The apparatus of claim 1 wherein said first beam transport means includes means for limiting the transverse extent of said focused beam spot.

4. The apparatus of claim 3 wherein said means for limiting comprises:
   a first lens disposed in the path of said ultraviolet laser beam for focusing said beam at an intermediate point of nominal focus;
   means defining a pinhole located at said intermediate point of nominal focus; and
   a second lens for collimating light emanating from said pinhole.

5. The apparatus of claim 3 wherein said first beam transport means and said second beam transport means include portions directing light along a common path segment, and wherein said means for limiting and said means for substantially preventing are both defined by a common set of elements in said common path segment.

6. The apparatus of claim 1 wherein said means for substantially preventing comprises:
   a lens disposed in the path of light passing through said objective from the location of said focused beam spot for focusing such light at an intermediate point of nominal focus; and
   means defining a pinhole located at said intermediate point of nominal focus.

7. The apparatus of claim 1, and further comprising stage means for imparting controlled movement of the sample along at least one axis in the plane of the sample surface.

8. The apparatus of claim 7 wherein said stage means comprises:
- a mechanical stage; and
- a piezoelectric transducer mounted to said mechanical stage and operative in response to an electrical signal to provide fine movement of the sample relative to the position established by said mechanical stage.

9. The apparatus of claim 1 wherein said first beam transport means includes a beam expander disposed in the path of said ultraviolet laser beam, said beam expander operating to increase the beam diameter to be commensurate with the diameter of said objective.

10. A method of measuring a sub-micron feature on a sample surface, comprising the steps of:
- generating an ultraviolet laser beam;
- focusing the laser beam to generate a focused beam spot at the sample surface;
- measuring the intensity of ultraviolet light emanating from the sample surface in the vicinity of the focused beam spot;
- substantially excluding from the measurement ultraviolet light emanating from points displaced from the location of the focused beam spot;
- imparting controlled movement of the sample along at least one axis in the plane of the sample surface; and
- correlating the measured intensity of ultraviolet light with position along the axis to extract an intensity profile representative of the feature to be measured.

11. The method of claim 10, and further comprising the steps of:
- measuring the intensity of visible light emanating from the sample surface in the vicinity of the focused beam spot; and
- correlating the intensity of visible light intensity with position along the axis to determine the extent of fluorescing materials as measured along the axis.

12. The method of claim 10 wherein said step of focusing the ultraviolet laser beam includes the substeps of:
- focusing the beam at an intermediate point of nominal focus;
- providing a pinhole at the intermediate point of nominal focus; and
- passing the light emanating from the pinhole through a high numerical aperture objective.

13. The method of claim 12, and further comprising the substep, carried out before said passing substep, of collimating the light emanating from the pinhole.

14. The method of claim 10 wherein said substantially excluding step comprises the substeps of:
- focusing light emanating from the sample surface in the vicinity of the focused beam spot at an intermediate point of nominal focus; and
- providing a pinhole at the intermediate point of nominal focus.

15. Apparatus for making a measurement of a feature on a sample surface, comprising:
- a high numerical aperture objective transmissive to ultraviolet light;
- a laser operable to produce an ultraviolet laser beam;
- an ultraviolet detector operable to produce a signal representative of the intensity of the ultraviolet light impinging thereon;
- first beam transport means for directing at least a portion of said ultraviolet laser beam to said objective, said first beam transport means including a spatial filter and a beam expander disposed in the path of said ultraviolet laser beam, said beam expander being configured to increase the beam diameter to be commensurate with the diameter of said objective, said first beam transport means and said objective operating together to provide a focused beam spot;
- second beam transport means for directing ultraviolet light that emanates from the location of said focused beam spot and subsequently passes through said objective to said ultraviolet detector, said second beam transport means including means for substantially preventing ultraviolet light that emanates from points displaced from the location of said focused beam spot from reaching said ultraviolet detector; and
- stage means for imparting controlled movement of the sample along at least one axis in the plane of the sample surface;
- wherein, when said ultraviolet laser is operated and the sample is registered with said focused beam spot on the sample surface and the axis of said objective perpendicular to the sample surface, said ultraviolet detector provides a signal representative of the ultraviolet light reflected from the sample surface.

16. The apparatus of claim 15 wherein said objective is also transmissive to visible light, and further comprising:
- a visible detector operable to produce a signal representative of the intensity of visible light impinging thereon; and
- third beam transport means for directing visible light that emanates from the location of said focused beam spot and subsequently passes through said objective to said visible light detector.

17. The apparatus of claim 15 wherein said spatial filter and said beam expander together comprise:
- a first lens disposed in the path of said ultraviolet laser beam for focusing said beam at an intermediate point of nominal focus;
- means defining a pinhole located at said intermediate point of nominal focus; and
- a second lens for collimating light emanating from said pinhole.

18. The apparatus of claim 15 wherein said means for substantially preventing comprises:
- a lens disposed in the path of light passing through said objective from the location of said focused beam spot for focusing such light at an intermediate point of nominal focus; and
- means defining a pinhole located at said intermediate point of nominal focus.

19. The appatus of claim 15 wherein said first beam transport means and said second beam transport means include portions directing light along a common path segment, and wherein said spatial filter and said beam expander and said means for substantially preventing are defined by a common set of elements in said common path segment.

20. The apparatus of claim 15 wherein said stage means comprises:
- a mechanical stage; and
- a piezoelectric transducer mounted to said mechanical stage and operative in response to an electrical signal to provide fine movement of the sample relative to the position established by said mechanical stage.

* * * * *